United States Patent
Morabit

(10) Patent No.: US 10,448,566 B2
(45) Date of Patent: Oct. 22, 2019

(54) CONVERTIBLE CAP AND HEAD SYSTEM

(71) Applicant: Aero-Flex Technologies, Inc., Rock Hill, SC (US)

(72) Inventor: Vincent D. Morabit, Rock Hill, SC (US)

(73) Assignee: AERO-FLEX TECHNOLOGIES, INC., Rock Hill, SC (US)

( * ) Notice: Subject to any disclaimer, the term of this patent is extended or adjusted under 35 U.S.C. 154(b) by 241 days.

(21) Appl. No.: 14/632,582

(22) Filed: Feb. 26, 2015

(65) Prior Publication Data

US 2015/0245558 A1 Sep. 3, 2015

Related U.S. Application Data

(60) Provisional application No. 61/946,568, filed on Feb. 28, 2014.

(51) Int. Cl.
*A01D 34/416* (2006.01)
*A01D 34/73* (2006.01)
*A01D 34/74* (2006.01)

(52) U.S. Cl.
CPC ........ *A01D 34/4165* (2013.01); *A01D 34/736* (2013.01); *A01D 34/74* (2013.01); *Y10T 29/49716* (2015.01)

(58) Field of Classification Search
CPC .............. A01D 34/416; A01D 34/4165; A01D 34/4166; A01D 34/4167; A01D 34/4168; A01D 34/4161–4163; A01D 34/412; A01D 34/63; A01D 34/73; A01D 34/733; A01D 34/736; A01D 34/74; A01D 34/81; A01D 34/90; Y10T 29/49716

USPC .................................................. 30/276, 347
See application file for complete search history.

(56) References Cited

U.S. PATENT DOCUMENTS

| | | |
|---|---|---|
| 4,095,338 A | 6/1978 | Naohiko |
| D254,173 S | 2/1980 | Proulx |
| 4,187,577 A | 2/1980 | Hansen et al. |
| 4,224,784 A | 9/1980 | Hansen et al. |
| 4,249,311 A * | 2/1981 | Inaga .................. A01D 34/4161 30/276 |
| 4,254,550 A * | 3/1981 | Satoh ................. A01D 34/4161 30/276 |
| 4,604,067 A | 8/1986 | Roberts |
| 4,790,071 A * | 12/1988 | Helmig .............. A01D 34/4166 30/276 |

(Continued)

OTHER PUBLICATIONS

Ryobi Universal Fixed Line Spool/Bump Line Spool kit, https://www.ryobitools.com/products/details/dual-spool-string-head, Apr. 2011, printed out on Feb. 24, 2017, 1 page.

(Continued)

Primary Examiner — Evan H Macfarlane
(74) Attorney, Agent, or Firm — Nixon & Vanderhye P.C.

(57) ABSTRACT

A trimmer can be converted from an existing cutting medium to an alternative tool without requiring removal of the trimmer head. A common upper receiver head, as sold by an original equipment trimmer manufacturer, incorporates design provisions to snugly allow an easy/comfortable fit for a series of uniquely adaptable and convertible cap attachments such as, monofilament systems, unique molded or shaped flexible line blades with optional cutting swath diameters, as well as other helpful devices that perform different functions beyond just cutting grass.

12 Claims, 9 Drawing Sheets

(56) References Cited

U.S. PATENT DOCUMENTS

| | | | |
|---|---|---|---|
| 4,884,340 A | 12/1989 | Newman | |
| 5,493,783 A * | 2/1996 | Oostendorp | A01D 75/206 30/276 |
| 5,852,876 A * | 12/1998 | Wang | A01D 34/733 30/276 |
| 5,906,051 A * | 5/1999 | Nannen | A01D 34/4163 30/276 |
| 6,415,585 B2 * | 7/2002 | Morabit | A01D 34/416 30/276 |
| 6,604,349 B2 | 8/2003 | Deal | |
| D482,581 S | 11/2003 | Nystrom | |
| D482,941 S | 12/2003 | Nystrom | |
| 8,567,074 B2 | 10/2013 | Arnetoli | |
| D715,608 S | 10/2014 | Cigarini | |
| D727,116 S | 4/2015 | Tinius | |
| D759,445 S | 6/2016 | Tinius | |
| D763,640 S | 8/2016 | Cigarini | |
| D785,420 S | 5/2017 | Tinius | |
| 2001/0003935 A1 * | 6/2001 | Morabit | A01D 34/4168 83/13 |
| 2002/0029483 A1 * | 3/2002 | Price | A01D 34/733 30/276 |
| 2003/0131481 A1 * | 7/2003 | Sullivan | A01D 34/416 30/276 |
| 2004/0154276 A1 * | 8/2004 | Brandon | A01D 34/4166 56/12.7 |
| 2007/0084061 A1 | 4/2007 | Bennett | |
| 2010/0101099 A1 * | 4/2010 | Morabit | A01D 34/416 30/347 |
| 2012/0131804 A1 | 5/2012 | Cigarini | |
| 2012/0159790 A1 * | 6/2012 | Hoelscher | A01D 34/90 30/275.4 |
| 2014/0013721 A1 * | 1/2014 | Paden | A01D 34/84 56/10.2 A |
| 2014/0150267 A1 * | 6/2014 | Sowell | A01D 34/4166 30/123 |
| 2014/0250699 A1 | 9/2014 | Weimer | |
| 2015/0271992 A1 | 10/2015 | Nagoshi | |
| 2017/0094900 A1 | 4/2017 | Arnetoli | |

OTHER PUBLICATIONS

U.S. Office Action dated Sep. 14, 2017 issued in Design U.S. Appl. No. 29/588,356, 13 pp.

* cited by examiner

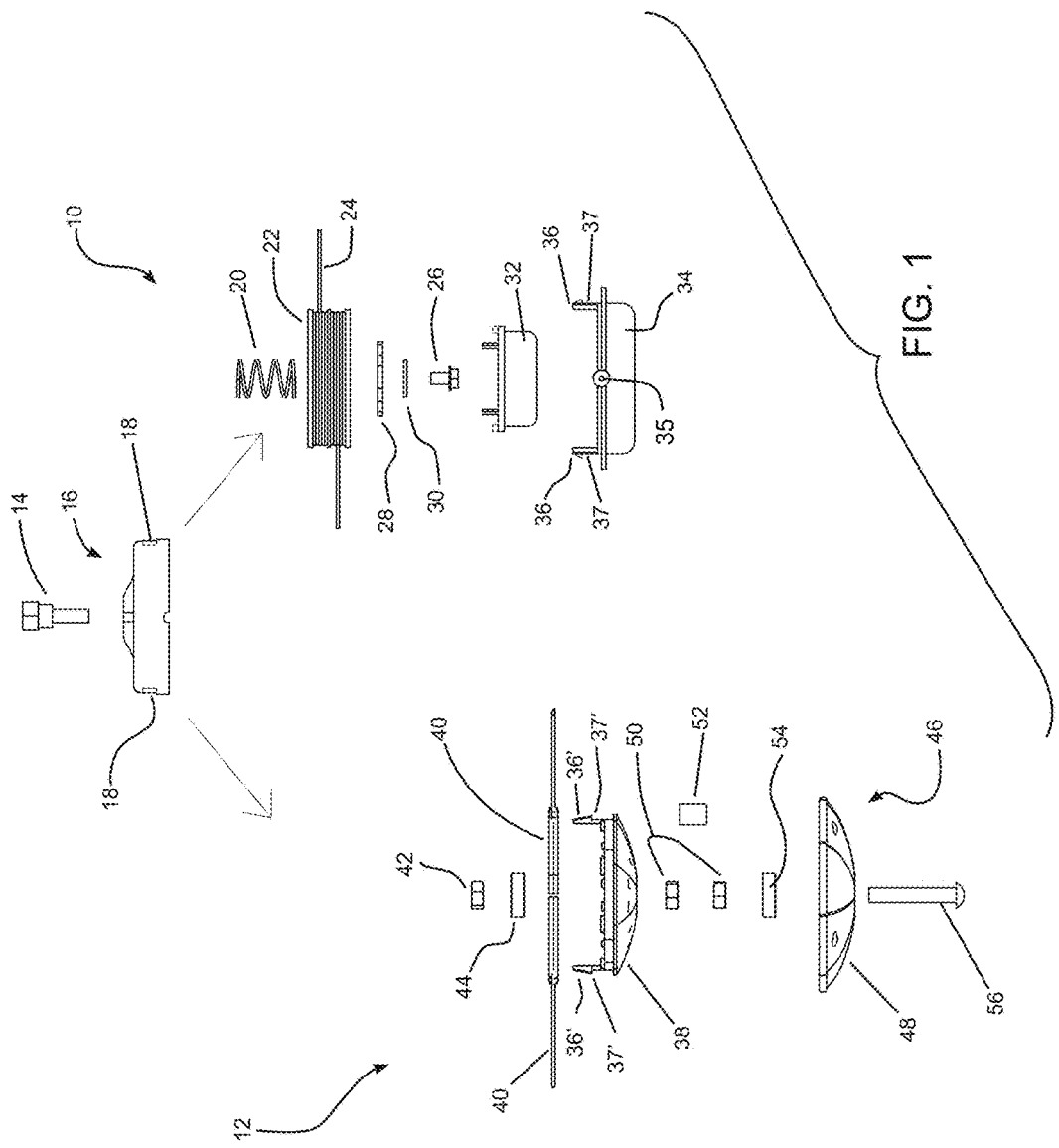

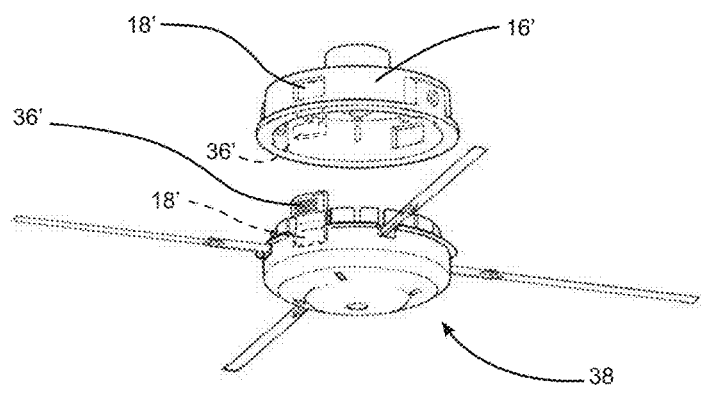
FIG. 2A
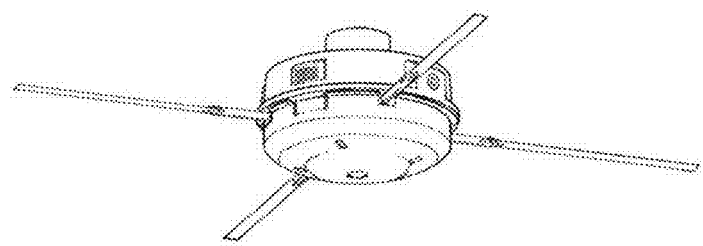
FIG. 2B
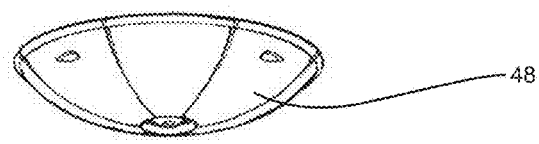
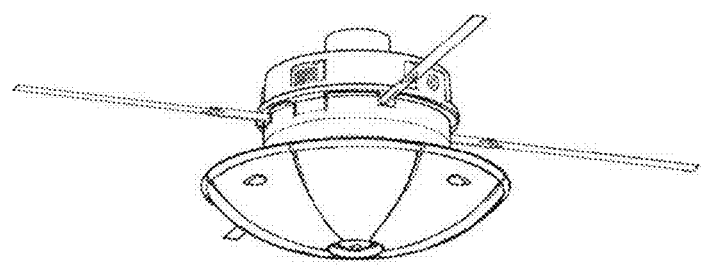
FIG. 2C

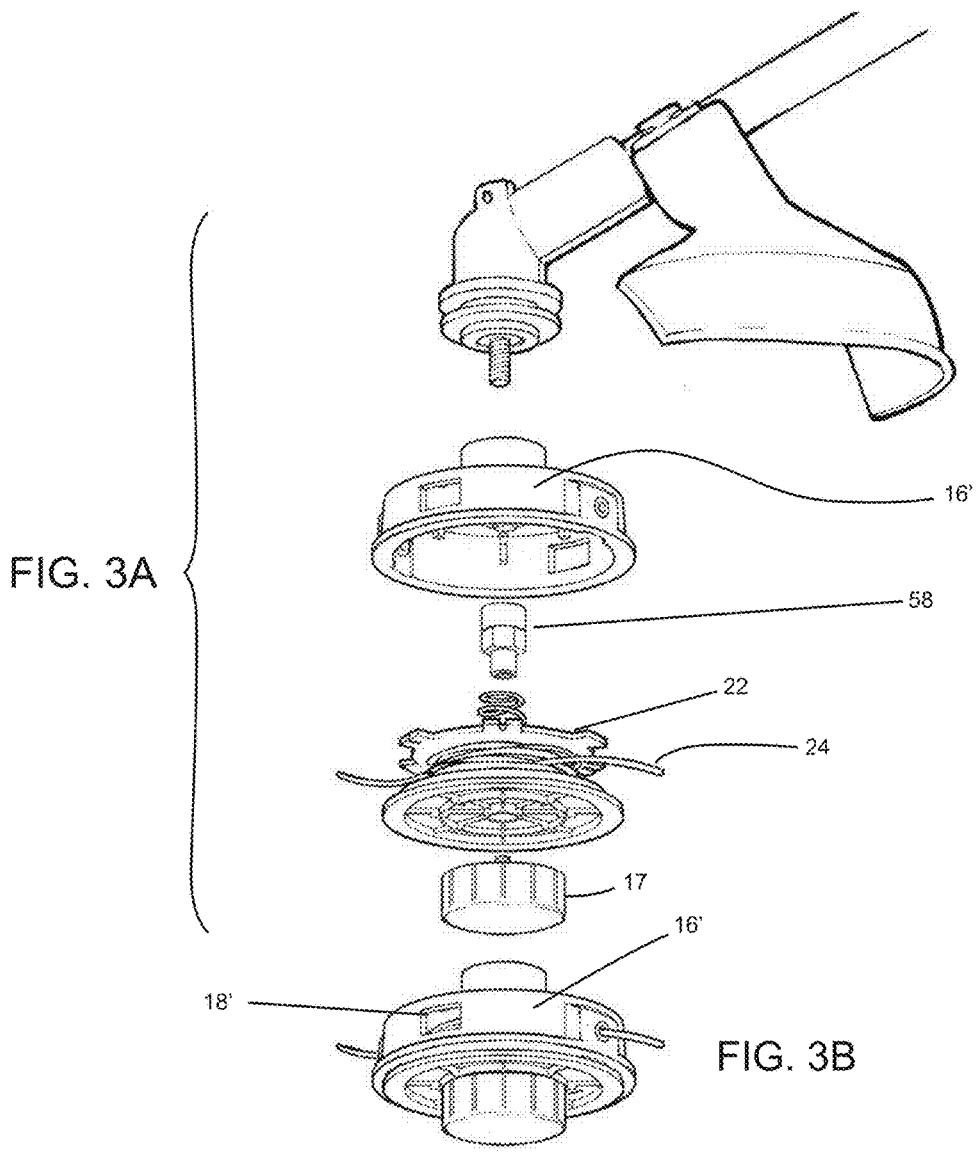

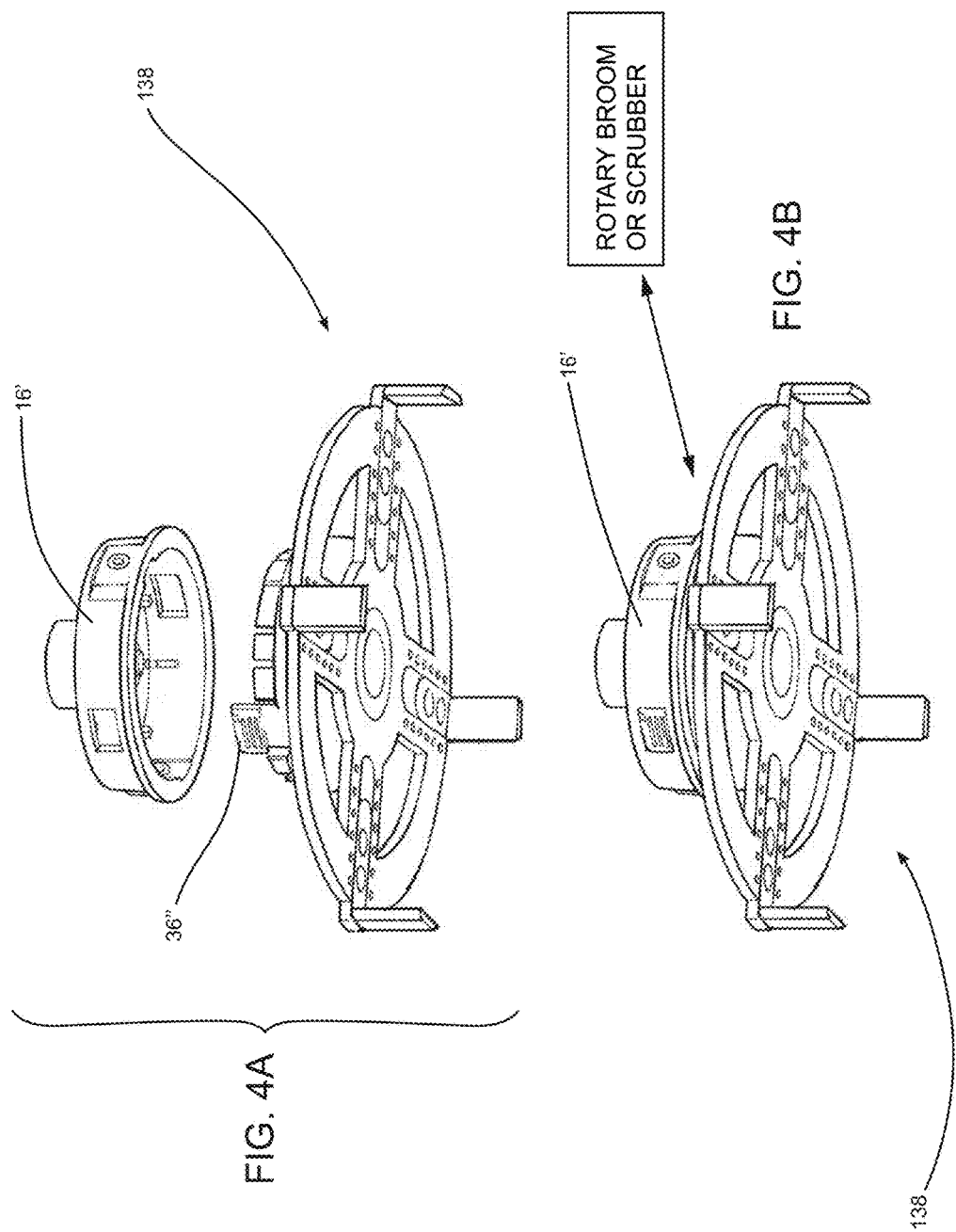

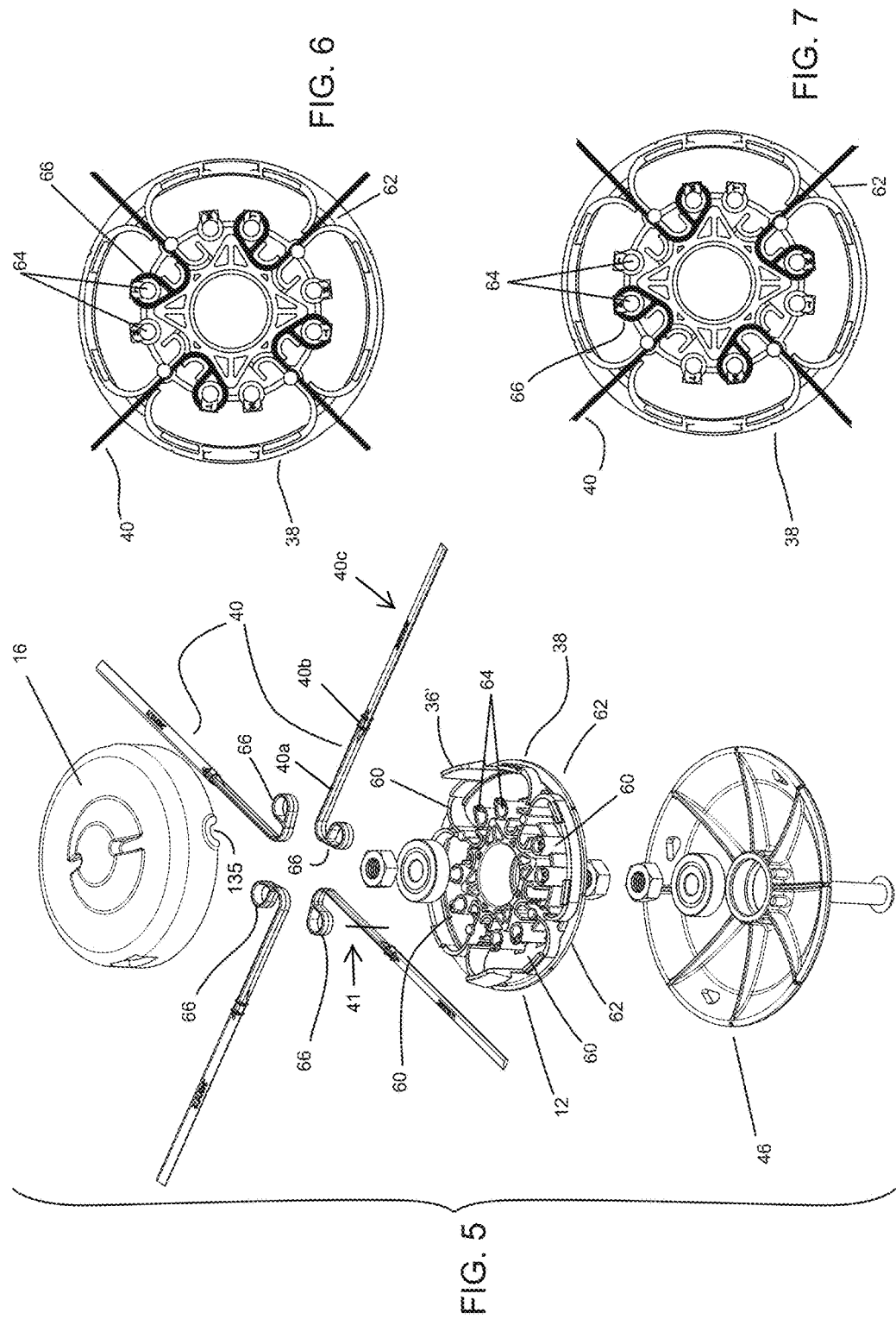

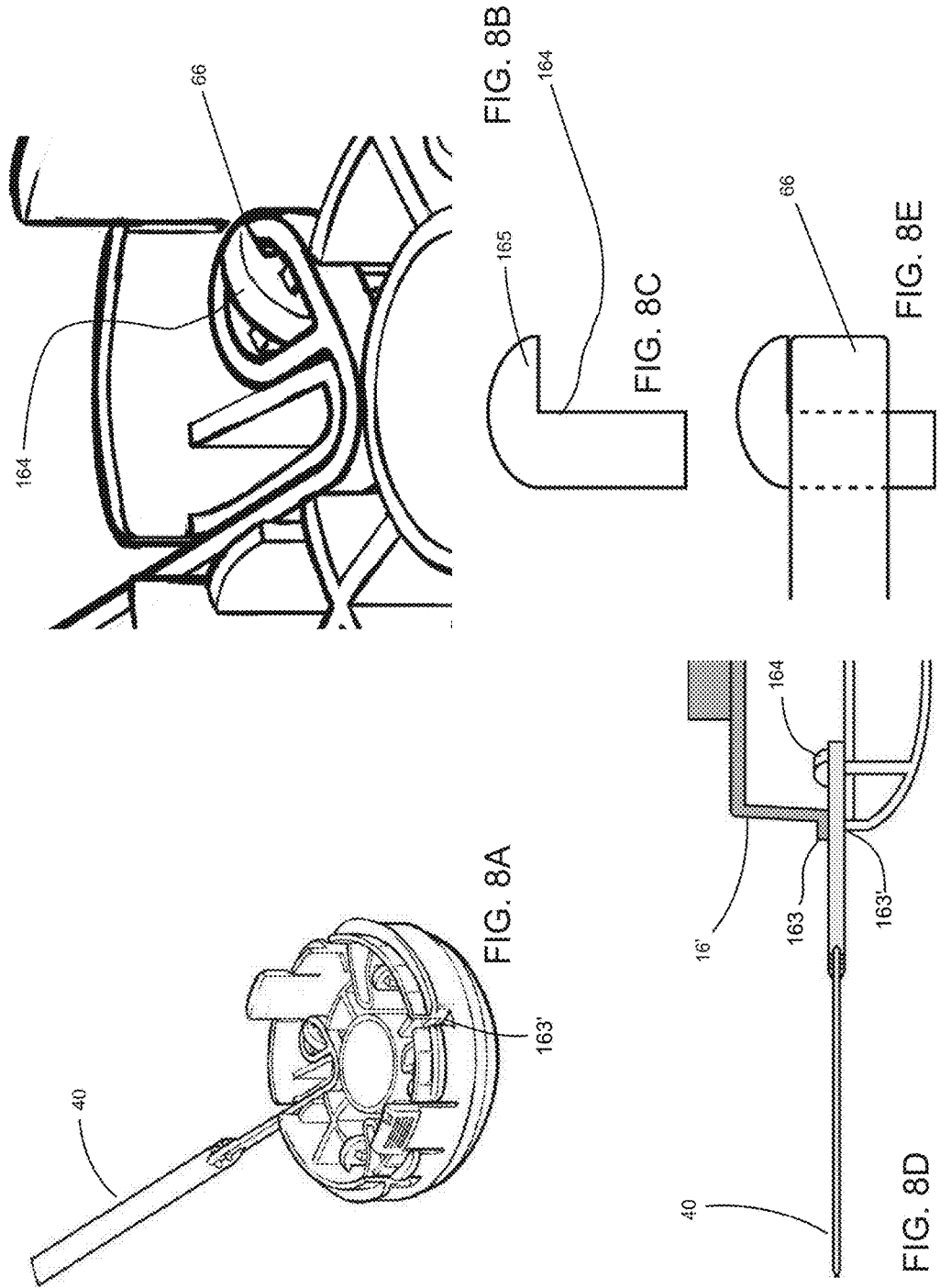

CONVERTIBLE CAP AND HEAD SYSTEM

CROSS-REFERENCES TO RELATED APPLICATIONS

This application claims the benefit of U.S. Provisional Patent Application No. 61/946,568, filed Feb. 28, 2014, the entire content of which is herein incorporated by reference.

STATEMENT REGARDING FEDERALLY SPONSORED RESEARCH OR DEVELOPMENT (Not Applicable)

BACKGROUND OF THE INVENTION

The invention relates to grass trimmers and, more particularly, to a convertible cap and head system for a trimmer that enables it to be converted from its original cutting medium to an alternative cutting medium or tool by changing at the head area, and not by changing the entire lower boom as currently practiced.

Handheld grass trimmers, powered by gas and or AC/DC electricity, have been popular outdoor tools for trimming grass and weeds along a variety of edges and into terrain where conventional mowers cannot practically or easily reach. Since their inception in the early 70's, trimmers have been largely confined to trimming light weeds and grass with monofilament string or nylon line (and/or metal/brittle plastic blades for heavier vegetation) as the primary cutting system used. Because of the high speeds required to reach the low mass mono line's cutting capability, high operating stresses cause continual breakage and consequently, manual or mechanical replenishment systems are needed to continuously feed or replenish the cutting line. Over the years, there have been limited improvements, but no real solution to the highly frustrating issues caused by weak and overstressed line.

In addition to the heavy and cantilevered weight the operator has to carry and maneuver, the trimmer, for the most part, must be handheld by the operator for many reasons because hitting the ground causes added line stresses to ultimately cause line breakage. Hitting abrasive surfaces should be avoided because it accelerates wear and breakage; hitting rocks or loose impediments should be avoided where possible to minimize dangerous thrown objects; only to name a few. Therefore, grass trimmers had to be 'hand held' to maneuver above and around the obstacles and impediments.

There are times when the operator may prefer to rest the spinning head and extended cutting line directly onto the ground to cut closer, or to try to cut at a given height, or perhaps for weight relief, but a number of problems, in addition to those related above, emerge as a result. Such problems may include thrusting, scalping, and other such control issues, as well as rapid line wear and breakage. Additionally, the surfaces rubbing onto the abrasive ground cause wear to the bump knob systems to become inoperable as the bumping knob grinds away.

Needless to say, handheld trimming can be a frustrating process with 'string' or 'flexible line' being the number one problem users have faced since the inception of the 'string' trimmer. For years, users have been constantly seeking solutions, as many new and different developments have offered promise toward a solution, but to no avail, mono line problems still remain the major problem. So very often, users want to try different systems that promise even the slightest improvement. To install such new innovations, however, removal of the old system becomes the requirement before the new system can be tested on the user's trimmer, or such replacements may likely not be properly installed to maintain the operator protection systems originally built into the trimmer.

Different users have different preferences for different cutting systems. For example, they may be satisfied with the original mono system provided with the original trimmer from the manufacturer which may likely include a popular bump type line replenishment system. On the other hand, due to poor line life and bump head complexities, they may want to try new innovative cutting systems with their own specific advantages. In either case, each original system, more than likely, must be removed in total and replaced by the other. There are generally no interchangeable or commonly used component parts. The entire system needs to be removed to make room for the replacement system to be mounted to the trimmer's arbor. In most cases, removal of the existing system is required to further assure the cutting line plane regulations with respect to the rear grass shield to be maintained to ANSI safety specifications.

Converting from the common manufacturer's grass trimmer mono filament line heads presents a great challenge if the user wants to change to another cutting system. In many cases, the original heads are permanently affixed, making it impossible to remove the old head system to adapt another system. Even if the old system is removable, the degree of difficulty can be extensive. Some systems, for example, use extra fastening and securing means such as more permanent retainer rings while others have special uncommon reverse threading needed for self-tightening purposes on different rotational directions. For example, a counterclockwise rotating trimmer needs left hand threads for self-tightening; otherwise, it could easily unscrew itself during decelerations.

Further, when removing the old head, it is a requirement to hold or lock the arbor so the head can be unscrewed from the arbor threads. Some trimmers do not have a visible means to hold the arbor, while others simply cannot be removed. These complexities have discouraged many customers incapable or unwilling to perform the needed conversion, thus denying the option of the new innovation. This is a very real and broad problem which this technology addresses.

It is also worth noting that conventional monofilament line does not cut grass to 'quality' conditions. It mashes and rips grass blades only to become 'sun brown' at these frazzled tips. The mono cutting line also pushes air and grass down and away from the cutting lines.

There is a further developing need for this easier 'conversion' innovation with newer developing technologies such as the trimmer's ground supporting glider, which now levels the cut while sharp leading flexible blades cut cleanly as they also lift air which lifts grass to effectively aid in cleaner cutting and rotary mowing. See, for example, U.S. patent application Ser. No. 14/280,916, the contents of which are hereby incorporated by reference. Additionally, a whole new series of benefits of the glider and line blade technologies will be further enhanced or emphasized with the contribution from the subject convertibility art.

BRIEF SUMMARY OF THE INVENTION

It is now beneficial to offer numerous choices to satisfy the many added and extended trimmer uses now offered with these new inventions and technologies.

A common upper receiver head, as sold by an original equipment trimmer manufacturer, would incorporate design provisions to snugly allow an easy/comfortable fit for a series of uniquely adaptable and convertible cap attachments such as, mono bump systems, unique molded or shaped flexible line blades with optional cutting swath diameters, as well as other helpful devices that perform different functions beyond just cutting grass.

The convertible cap from mono line to line blades, for example, would be designed to fit snugly into the upper receiver head while its finger tabs, in this case, click into open window slots within the receiver head. To remove the cap, the finger tabs of the cap are deflected inward to clear away from the window slots.

It would also be most helpful to have an upper head receiver that can utilize common mono line spools and knob components. This would allow interchangeability of existing components (the more common spools and knobs) already in use, to save additional start-up and tooling expense to both manufacturers and users. For example, the receiver head may contain the internal projections needed for the mono line bump advancing mechanism, which remain clear of interference with any other lower cap attachment options.

Additionally, a removable arbor adapter may be provided for use with conventional knobs to retain the common line spool. It further enables either a bolt-on cap, or finger tab retention mechanisms to give optional attaching means for other optional and useful cap designs. This arbor adapter device is a part of the convertibility solution, as it enables different cap clamping options. It connects or disconnects directly to or from the driving arbor and can be any shape or length to support the particular needs of the attachment option. When the arbor adapter is used, the finger tab window in the head receiver remains open while offering a view when the internal line spool is installed to visually determine how much line remains.

BRIEF DESCRIPTION OF THE DRAWINGS

These and other aspects and advantages will be described in detail with reference to the accompanying drawings, in which:

FIG. 1 shows exploded views for an exemplary convertible head system that provides for converting an existing bump line monofilament string cutting medium to a cap-mounted line blade cutting medium with a glider attachment;

FIGS. 2A-2C are assembly views of a converted cap supporting line blades;

FIGS. 3A and 3B show an assembly utilizing an arbor adapter;

FIGS. 4A and 4B show an assembly for an alternative tool for use with the trimmer;

FIGS. 5-7 show components for a convertible cap including posts for supporting line blades in multiple orientations;

FIGS. 8A-10B show securing arrangements for line blades; and

DETAILED DESCRIPTION OF THE INVENTION

Figure 9B:
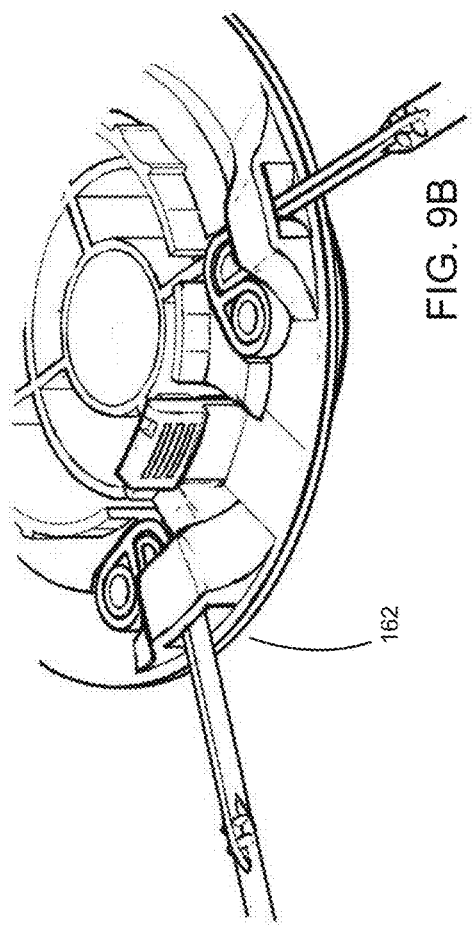
Figure 9C:
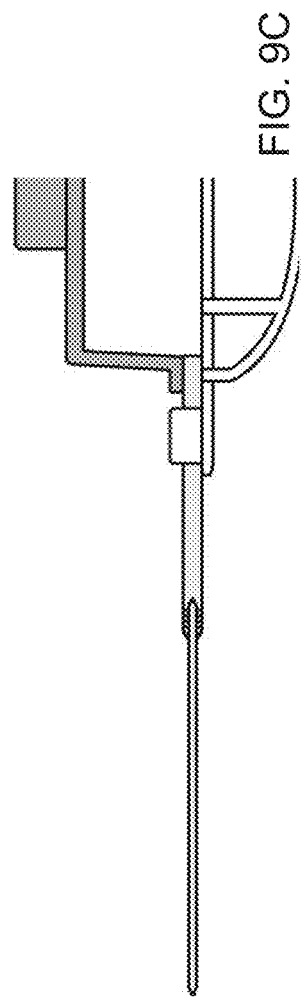
Figure 9A:
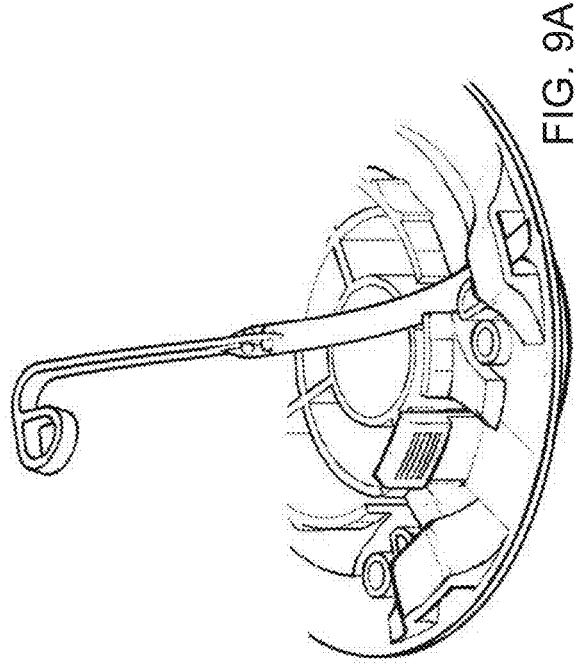
Figure 10A:
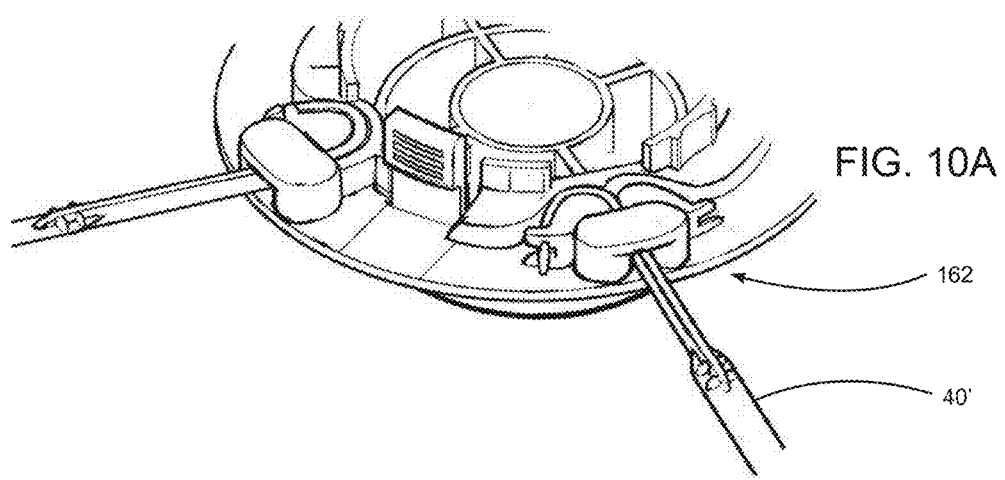
Figure 10B:
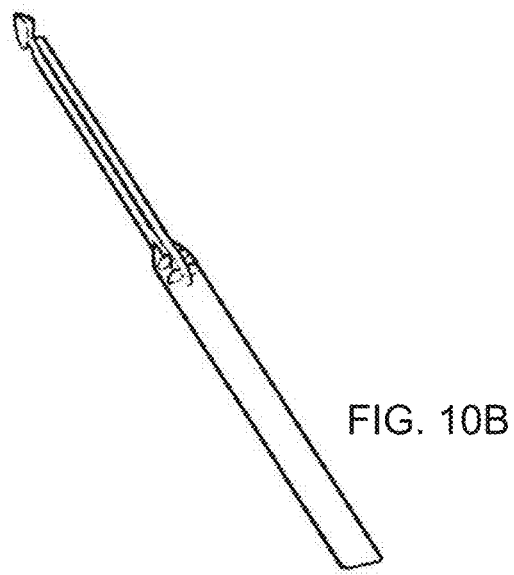

FIG. 1 is an exploded view showing an existing monofilament line bump feed system 10 convertible to a line blade system 12 without requiring removal of an entire trimmer head.

An arbor 14 is conventionally driven by a motor unit or the like and driving components (not shown). Any suitable motor unit and driving components can be used with the convertible head system according to preferred embodiments. An upper head 16 is fixed to the arbor 14 for rotation with the arbor 14. The upper head 16 is provided with one or more, preferably two, finger tab windows 18 for connecting and securing the trimmer components.

With continued reference to FIG. 1, the assembly for a monofilament cutting line may include a spring 20 interposed between a line spool 22 and the upper head 16, where the monofilament line 24 is wound on the spool 22. A bolt 26 secures the spool 22 through a line retainer 28 and a washer 30. A bump cap 32 is cooperable with the spool 22, and a cap 34 encloses the assembly. The cap 34 includes one or more finger tabs 36, preferably two, that snap into engagement with the finger tab windows 18 in the upper head 16. The cap 34 includes line outlets/eyelets 35 for the monofilament line 24 that define a monofilament line eyelet plane.

The monofilament line assembly 10 can be converted to the line blade system 12 without removing the upper head 16 from the arbor 14. The monofilament line system 10 is readily removed by releasing the cap 34 from the finger tab windows 18 in the upper head 16. With the components removed, the line blade system 12 can be attached to the upper head 16. The line blade system 12 includes a main convertible cap 38 supporting a plurality of line blades 40 with a nut 42 and bearing 44 interposed between the cap 38 and the upper head 16. The main convertible cap 38 similarly includes finger tabs 36' engageable in the finger tab windows 18 of the upper head 16. The finger tabs 36' are deflectable via an active hinge 37' between the finger tabs 36' and the cap 38. In the embodiments shown in FIG. 1, an optional glider assembly 46 is also attached and includes a disk-shaped glider 48 disposed on a ground side of the convertible cap 38 with nuts 50, a spacer 52 and a bearing 54 interposed between. The assembly is secured by a bolt 56 or other suitable connecting structure.

The equipment manufacturer may thus initially provide the trimmer with the monofilament line system 10. With the upper head adaptable for attachable cap options, an alternative monofilament line, or the line blade system 12 shown in FIGS. 1 and 2A-2C, and/or other tools can be interchangeably attached. Since the upper head 16 utilizes common attaching features, the upper head 16 in FIG. 1 may differ in size or shape as in upper head 16' shown in FIGS. 2A-2C or FIGS. 3A/3B, and does not need to be removed from the arbor 14. As a consequence, converting from one assembly to another can be readily accomplished. The convertible cap system preferably encompasses a family of systems to accommodate varying existing systems including line bump systems, centrifugal feed systems, manual systems, and the like typically used with monofilament line. Of course, if the user decides to reassemble the monofilament line system 10, the construction of the upper head 16, 16' and the convertible head assembly provides for easy re-conversion.

With reference to FIGS. 3A and 3B, an arbor adapter 58 may be coupleable with the arbor 14. The arbor adapter 58 serves to extend the arbor 14 such that a different style or type of trimmer spool 22 can be clamped or connected (without use of finger tabs) to a receiver head 16' by a threaded knob 17. When the trimmer spool 22, the arbor adapter 58, and the knob 17 are removed from the upper head 16', the main line blade convertible cap 38 is then attached to the upper head 16' by the finger tabs 36' engaging the windows 18' of the upper head 16'. When the spool 22 is clamped to the arbor 14 with the arbor adapter 58 and the knob 17, the finger tab windows 18' in the upper head 16' are open, and the existing trimmer spool and corresponding components are viewable through the finger tab windows 18'.

Still other alternative caps may be interchangeable with the main convertible cap 38, where the alternative convertible caps support tools for use with the trimmer. Exemplary tools may include a sprinkler head cutter, a rotary broom/scrubber, and the like. FIGS. 4A and 4B show an alternative convertible cap 138 with a sprinkler head cutter.

FIGS. 5-7 show details of the main convertible cap 38. As shown, the convertible cap 38 includes a plurality of line blade connectors 60 and blade outlets 62. The line blades 40 are connected to the line blade connectors 60 in the convertible cap 38 and are positioned through the line blade outputs 62. It is preferable in the line blade assembly to have an even number of outlets (e.g., two or four outlets) for balance to be maintained with wear throughout the life of the extended line blade. The line blade connectors 60 may include line blade posts 64 or hood posts 64 that are sized and shaped to receive and retain connector eyelets 66 formed at proximal ends of the line blades 40. In cooperation with the upper head 16 also clamping onto the line blades 40, the additional hooded posts 64 retain the line blades 40 in at least two locations. With the use of finger tabs 36', cap retention is not dependent on a threading direction, and the assembly works for multi-directional rotation (clockwise or counterclockwise). Additional flip-flop posts can be included to provide options for line blade directional benefits at the cutting zone. The line blades can be oriented with a leading sharp edge or a leading aero edge to produce updraft or down draft, respectively. Updraft will lift grass for rotary mowing, whereas down draft will blow debris away. In one embodiment, the line blade directional posts are marked "M" for mow and "T" for trim for the line blade assembly (see FIGS. 6 and 7). In a preferred construction, each of the line blade connectors 60 includes two line blade posts 64 for each of the line blade outlets 62. In an exemplary configuration, using a molded line having an aerodynamic cross-section, alternative advantages can be achieved by varying a leading edge of the aerodynamic cross-section. As shown for example in FIG. 5, the line blades 40 may each include a pivot section 40a, a transition section 40b, and a cutting section 40c. The pivot section 40a has an essentially vertical orientation (i.e., its height dimension is greater than its width dimension) with a vertical pivot axis 41, and the cutting section 40c on the opposite side of the transition section 40b has a more horizontal orientation (i.e., its width dimension is greater than its height dimension). The vertical pivot axis 41 is parallel to a rotation axis of the convertible cap 38. The two line blade posts 64 for each of the line blade outlets 62 enable each of the line blades 40 to be alternately oriented. In the exemplary configuration shown in FIG. 6, the line blades 40 are secured in a first orientation for a trimming operation, and in FIG. 7, the line blades 40 are secured in a second orientation for a mowing operation. The exemplary configuration shown in FIG. 5 also includes the glider assembly 46. Other configurations are described in commonly-owned U.S. patent application Ser. No. 12/607,548, the contents of which are hereby incorporated by reference.

With the system of the preferred embodiments, the line blades 40 are loaded into the cap 38 and not into the head 16. Compared to the older line blade system, the user does not have to hold the trimmer while loading line blades and can select a larger swath diameter head more suited to perform different jobs. The convertible head/cap combination can be used with any conceivable attachment, with or without a glider. There are also provisions for mounting the glider disc and bearing shaft. Although not essential with the common provision involving grass shield designs, it is preferable for the upper head/cap split to be located at or near the monofilament line eyelet (e.g., eyelets 35 in FIG. 1, eyelets 135 in FIG. 5) line plane to maintain the same line plane for adequate and proper functioning of the shield's protective flange. The optional use of the glider assembly further enhances the many benefits of the convertible system. For example, the glider assembly enables the trimmer to be operated while it rests directly on the ground. When used with the glider assembly, a single or double bearing system can be provided. The single bearing system includes a bearing within the glider or cap. The bearing is set into either the cap or glider with plate retainers and screws or is preferably molded into the cap or glider.

It is desirable for the line blade connectors to include at least two securing places for each of the line blades 40. In the line blade embodiments, the lower flange of the upper head 16 becomes an upper clamping zone to physically hold the line blades 40 in their respective slots. See FIGS. 8A-8E and 9A-9C. That is, the outer rim of the upper head above the outlet can sandwich the line blades between an engaging surface 163, 163' of the head and/or the cap, respectively, while allowing its swing radius support. Exemplary structures may also include specially designed retaining posts 164 as shown in FIGS. 8B-8D. The retaining post 164 includes an upper flange 165 that positively engages the eyelet 66 of the line blades 40. The retaining posts 164 firmly secure the line blades 40 into a secure position and maintain its support within its respective channel leading to the outlet 62. Other alternatives are shown in FIGS. 9A-9C and 10A-10B, including a channeled outlet 162.

Preferably, the upper head 16, 16' and convertible cap are injection molded parts using conventional molding technology with reasonably inexpensive and durable nylon copolymers, either with or without glass reinforcement fibers for added strength as needed.

Figure 11:
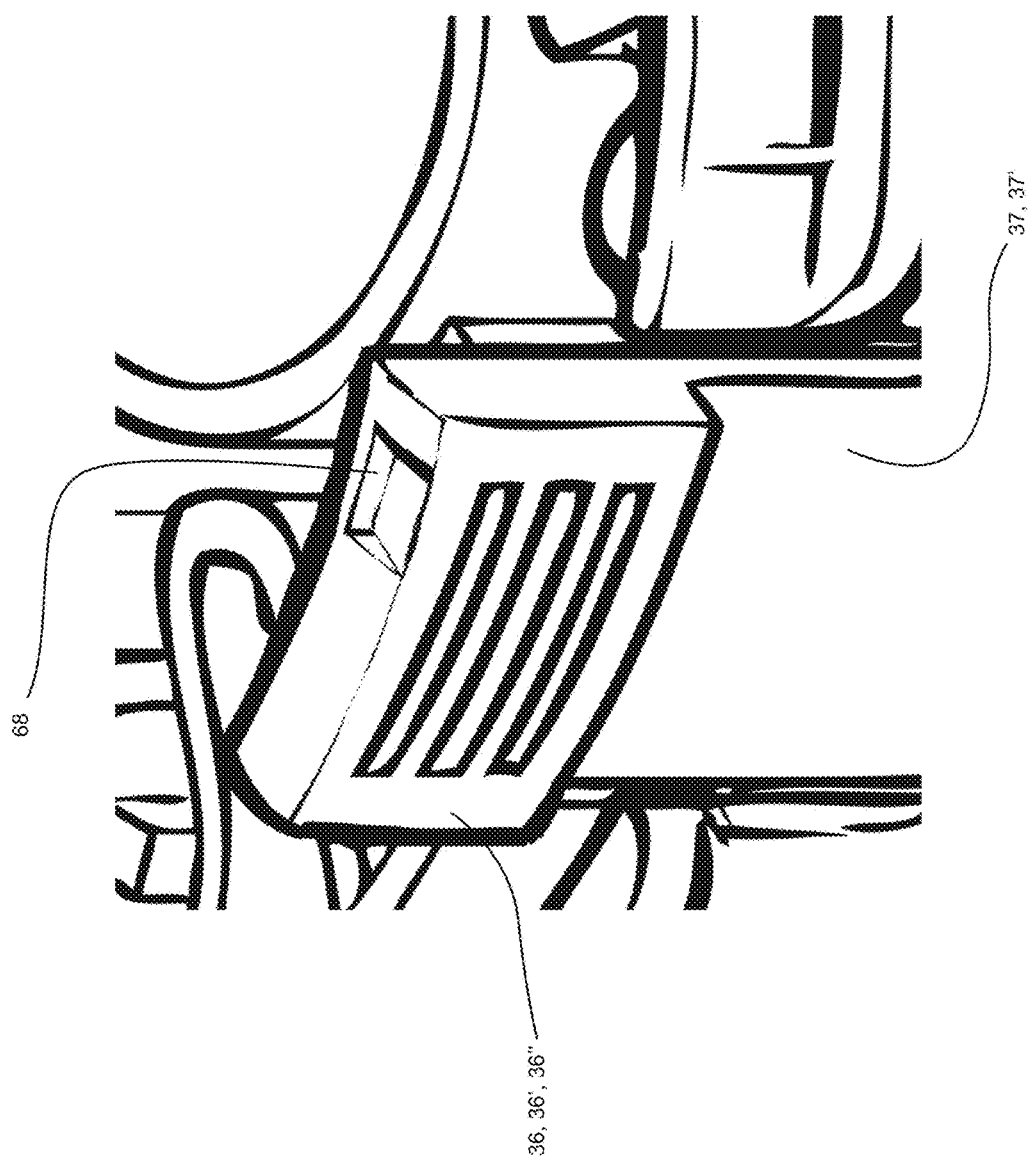
FIG. 11 is a close-up view of a finger tab of the convertible cap.

With reference to FIG. 11, to assist with removing the convertible cap assembly when desired, a screwdriver slot 68 is formed at the end of the finger tabs 36, 36', 36" to enable a tool (e.g., screwdriver) to deflect and disengage the tabs 36 to remove the cap for line blade replacement and reloading.

In use, a trimmer head can be converted from one cutting medium to an alternative tool using the convertible cap assembly of the preferred embodiments. In order to convert the trimmer head, the lower head and the one cutting medium (e.g., spooled monofilament line) are removed. The alternative tool is secured in the convertible cap, and the convertible cap is secured to the upper head. As noted, in one construction, the convertible cap includes line blade connectors and line blade outlets, where the alternative tool includes a plurality of line blades. The step of securing the alternative tool to connectors in the convertible cap is practiced by securing the line blades to the line blade connectors in the convertible cap and positioning the line blades through the line blade outlets. The glider assembly may be secured at the user's option.

The system and methods according to the preferred embodiments enable an existing monofilament line to be converted to line blades with or without a glider assembly without the user having to remove the original head for the new replacement option. The convertible cap can be used with molded or formed line blades to achieve sharp/aerodynamic leading edge with updrafts. The resulting construction can achieve flexible line blade rotary mowing without head removal for contour mowing and general trimming. The glider assembly provides for ground supported thrust-free grass trimming, still without requiring removal of the trimmer head. The construction extends work functions of the trimmer beyond cutting vegetation with different attachments.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A convertible head system for a trimmer, the trimmer including an arbor cooperable with a trimmer shaft, the convertible head system comprising:
    an upper head securable to the arbor;
    a first convertible cap selectively attachable to the upper head and containing a monofilament line assembly;
    a second convertible cap selectively attachable to the upper head and exchangeable with the first convertible cap, the second convertible cap including line blade connectors and line blade outlets; and
    a plurality of line blades connected to the line blade connectors in the second convertible cap and positioned through the line blade outlets,
    wherein the line blade connectors secure each of the plurality of line blades, and wherein the second convertible cap comprises an engaging surface that is cooperable with the upper head to sandwich the line blades in direct engagement with the engaging surface and a perimeter of the upper head such that each of the plurality of line blades is secured at two points.

2. A convertible head system according to claim 1, wherein the upper head includes one or more finger tab windows or one or more finger tabs, the convertible head system further comprising the other of the one or more finger tabs or the one or more finger tab windows coupled with the first convertible cap and the second convertible cap and engageable with the finger tab windows or the finger tabs, respectively, in the upper head.

3. A convertible head system according to claim 2, wherein the finger tabs are deflectable via an active hinge between the finger tabs and the first and second convertible caps.

4. A convertible head system according to claim 2, further comprising a glider assembly coupleable with the second convertible cap, the glider assembly including a disc-shaped glider disposed on a ground side of the second convertible cap.

5. A convertible head system according to claim 1, further comprising an alternative convertible cap interchangeable with the first and second convertible caps, the alternative convertible cap supporting tools for use with the trimmer.

6. A convertible head system according to claim 5, wherein the alternative convertible cap supports one of a sprinkler head cutter and a rotary broom/scrubber.

7. A convertible head system according to claim 1, further comprising a glider assembly coupleable with the second convertible cap, the glider assembly including a disc-shaped glider disposed on a ground side of the second convertible cap.

8. A convertible head system according to claim 1, wherein the line blade connectors comprise line blade posts formed in the second convertible cap.

9. A convertible head system according to claim 8, comprising two alternative line blade posts for each of the line blade outlets, the two alternative line blade posts being separated circumferentially and providing for alternative orientations for the line blades.

10. A convertible head system for a trimmer, the convertible head system comprising:
    an upper head securable to a trimmer shaft and cooperable with an arbor;
    a first convertible cap attachable to the upper head, the first convertible cap including line blade connectors and line blade outlets, the line blade connectors being positioned within a circumference of the upper head when the first convertible cap is attached to the upper head;
    a second convertible cap attachable to the upper head, the first and second convertible caps being selectively interchangeable, wherein the second convertible cap supports tools for use with the trimmer; and
    a glider assembly selectively coupleable directly to at least the first convertible cap, the glider assembly including a disc-shaped glider disposed on a ground side of the first convertible cap and a bearing between the disc-shaped glider and the first convertible cap,
    wherein the first convertible cap is functional with or without the glider assembly attached, wherein the first convertible cap is removable from the upper head with the glider assembly remaining attached to the first convertible cap, and wherein the first convertible cap is attachable to and removable from the upper head without removing the upper head.

11. A convertible head system according to claim 10, wherein the upper head includes one or more finger tab windows or one or more finger tabs, the convertible head system further comprising the other of one or more finger tabs or one or more finger tab windows coupled with the first and second convertible caps and selectively engageable with the finger tab windows or the finger tabs, respectively, in the upper head.

12. A convertible head system for a trimmer, the trimmer including an arbor cooperable with a trimmer shaft, the convertible head system comprising:
    an upper head having a circumference and securable to the arbor;
    a first convertible cap selectively attachable to the upper head and containing a monofilament line assembly, the monofilament line assembly including a spool of monofilament cutting line that is oriented to exit the first convertible cap on a monofilament line eyelet plane aligned with a bottom surface of the upper head when the first convertible cap is attached to the upper head;
    a second convertible cap selectively attachable to the upper head and exchangeable with the first convertible cap, the second convertible cap including line blade connectors and line blade outlets, the line blade connectors being positioned within the circumference of the upper head when the second convertible cap is attached to the upper head; and
    a plurality of line blades connected to the line blade connectors in the second convertible cap and positioned through the line blade outlets, wherein the line blades are positioned in engagement with the bottom surface of the upper head when the second convertible cap is attached to the upper head, and wherein a pivot axis of the line blades has a vertical orientation parallel to a rotating axis of the second convertible cap.

\* \* \* \* \*